US012420663B1

United States Patent
Lu et al.

(10) Patent No.: US 12,420,663 B1
(45) Date of Patent: Sep. 23, 2025

(54) HIGH-ENERGY-EFFICIENCY LITHIUM BATTERY MONORAIL HOIST LOCOMOTIVE AND BATTERY MANAGEMENT SYSTEM THEREOF

(71) Applicant: China University of Mining and Technology, Jiangsu (CN)

(72) Inventors: Hao Lu, Jiangsu (CN); Zhencai Zhu, Jiangsu (CN); Wenqing Yang, Jiangsu (CN); Yuxing Peng, Jiangsu (CN); Yu Tang, Jiangsu (CN); Wei Wang, Jiangsu (CN); Huaxu Ma, Jiangsu (CN); Lijie Wang, Jiangsu (CN); Pengwei Yan, Jiangsu (CN)

(73) Assignee: China University of Mining and Technology, Jiangsu (CN)

( * ) Notice: Subject to any disclaimer, the term of this patent is extended or adjusted under 35 U.S.C. 154(b) by 0 days.

(21) Appl. No.: 19/263,403

(22) Filed: Jul. 8, 2025

(30) Foreign Application Priority Data

Jul. 23, 2024 (CN) .......................... 202410989947.3

(51) Int. Cl.
*B60L 58/12* (2019.01)
*B61B 3/02* (2006.01)
(Continued)

(52) U.S. Cl.
CPC ............... *B60L 58/12* (2019.02); *B61B 3/02* (2013.01); *B61C 3/02* (2013.01); *B61C 9/46* (2013.01);
(Continued)

(58) Field of Classification Search
CPC ............... B60L 58/22; B60L 2240/547; B60L 2200/26; B60L 3/0046; B60L 58/12;
(Continued)

(56) References Cited

U.S. PATENT DOCUMENTS

2010/0019718 A1 * 1/2010 Salasoo .................. B60L 58/15
320/128
2011/0260687 A1 * 10/2011 Kudo .................. H01M 10/441
320/118

(Continued)

FOREIGN PATENT DOCUMENTS

CN 202111502 1/2012
CN 105217469 1/2016
(Continued)

OTHER PUBLICATIONS

"Office Action of China Counterpart Application", issued on Nov. 29, 2024, with English translation thereof, p. 1-p. 19.

*Primary Examiner* — Zachary L Kuhfuss
(74) *Attorney, Agent, or Firm* — JC ONE WORLD

(57) ABSTRACT

A high-energy-efficiency lithium battery monorail hoist locomotive includes a driving unit, a battery unit and a bearing trolley. The bearing trolley bears cargoes, the battery unit outputs the power to the driving unit, and the driving unit drives the locomotive to move. The battery unit includes a battery management system (BMS), an ultra capacitor and a battery pack formed by single cells. The BMS obtains the minimum state of charge difference value $\Delta SOC_{min}$ between the single cells, the state of charge $SOC_n$ of each single cells, the maximum state of charge $SOC_{max}$ among the single cells and the minimum state of charge $SOC_{min}$ among the single cells. The ultra capacitor and the battery pack are controlled by the BMS to charge and discharge. The charging and discharging of the battery pack are managed by the BMS, and the ultra capacitor plays a buffering role in the charging and discharging process.

9 Claims, 3 Drawing Sheets

(51) Int. Cl.
*B61C 3/02* (2006.01)
*B61C 9/46* (2006.01)
*B61C 17/06* (2006.01)
*B61L 23/04* (2006.01)
*B61L 25/02* (2006.01)
*E21F 13/00* (2006.01)

(52) U.S. Cl.
CPC .............. *B61C 17/06* (2013.01); *B61L 23/04* (2013.01); *B61L 25/021* (2013.01); *B61L 25/025* (2013.01); B60L 2200/26 (2013.01); *E21F 13/00* (2013.01)

(58) Field of Classification Search
CPC .... B60L 58/14; B60L 58/15; B60L 2240/549; B60L 2240/545; Y02T 10/70; B61B 3/02; Y02E 60/10; B61C 3/02; B61C 9/46; B61C 17/06; B61L 23/04; B61L 25/021; B61L 25/025; E21F 13/00
USPC .................................................. 320/118, 134
See application file for complete search history.

(56) References Cited

U.S. PATENT DOCUMENTS

| | | | | |
|---|---|---|---|---|
| 2014/0152261 | A1* | 6/2014 | Yamauchi | H01M 10/441 320/118 |
| 2014/0225622 | A1* | 8/2014 | Kudo | B60L 7/14 324/433 |
| 2015/0070023 | A1* | 3/2015 | Kudo | G01R 31/396 324/426 |
| 2016/0061901 | A1* | 3/2016 | Kudo | G01R 31/396 324/426 |
| 2017/0214252 | A1* | 7/2017 | Preindl | H02J 7/345 |
| 2020/0195020 | A1* | 6/2020 | Tanaka | H02J 7/0014 |
| 2022/0131400 | A1* | 4/2022 | Nakao | B60L 58/12 |

FOREIGN PATENT DOCUMENTS

| | | | | |
|---|---|---|---|---|
| CN | 109435763 | | 3/2019 | |
| CN | 112850481 A | * | 5/2021 | ............. B66C 13/16 |
| CN | 117585023 | | 2/2024 | |
| CN | 117895146 | | 4/2024 | |
| WO | WO-2023097632 A1 | * | 6/2023 | ............. B66C 13/20 |

* cited by examiner

HIGH-ENERGY-EFFICIENCY LITHIUM BATTERY MONORAIL HOIST LOCOMOTIVE AND BATTERY MANAGEMENT SYSTEM THEREOF

CROSS-REFERENCE TO RELATED APPLICATION

This application claims the priority benefit of China application no. 202410989947.3, filed on Jul. 23, 2024. The entirety of the above-mentioned patent application is hereby incorporated by reference herein and made a part of this specification.

BACKGROUND

Technical Field

The present disclosure relates to the field of the mining transportation, and specifically relates to a high-energy-efficiency lithium battery monorail hoist locomotive and a battery management system thereof.

Description of Related Art

In recent years, the production scale and mechanized production level of the coal industry have been greatly improved in China. In order to adapt to the characteristics of multiple underground transportation links and complex tunnel environment, the promotion of the efficient auxiliary transportation equipment is an important link in the development of the coal industry at this stage in China. As an important auxiliary transportation way for the high production and efficiency underground, the monorail hoist locomotive has the advantages of small machine section, high utilization rate of tunnel section space, and convenient loading and unloading.

At present, in China, the power systems utilized in the monorail hoist locomotives in major coal mines mainly include the diesel engine power system and the battery power system. Traditional diesel engine monorail hoist locomotives have problems such as high noise, serious exhaust gas pollution and high costs, while the lead-acid batteries have problems such as heavy metal pollution, large size, heavy weight and frequent charging. In view of the characteristics of the limited underground space and the high requirements for battery life, it is necessary to improve the previous explosion-proof lead-acid batteries. The lithium batteries have high energy density, long cycle life, simple maintenance and are environmentally friendly. With the maturity of the lithium-ion battery technology, it is possible to develop the lithium-ion battery supplies that satisfy the requirements of the underground explosion-proof technology.

The underground operation conditions of the monorail hoist locomotives are complex, a plurality of the slopes and bends are in the tunnel, and the geological conditions are complex. When the monorail hoist locomotive travels in a high-power charging and discharging condition, the fluctuations of the charging and discharging current and the voltage are relative large, and the capacity of battery is attenuated too rapidly, and the lithium-ion battery is large in size and has a low energy density. The monorail hoist locomotives consume a lot of energy when overloaded, therefore it is necessary to develop a high-efficiency monorail hoist locomotive travelling mode to improve the energy utilization.

SUMMARY

In view of the above problems in the prior art, a high-efficiency-energy lithium battery monorail hoist locomotive is provided in the present disclosure. The monorail hoist locomotive includes a driving unit, a battery unit and a bearing trolley. The bearing trolley is configured to bear cargoes, the battery unit is configured to output a power to the driving unit, the driving unit is configured to drive the monorail hoist locomotive to move. The battery unit includes a battery management system, an ultra capacitor and a battery pack formed by a plurality of single cells. The battery management system is configured to obtain a minimum state of charge difference $\Delta SOC_{min}$ between the single cells in the battery pack, and a state of charge $SOC_n$ of each of the single cells, a maximum state of charge $SOC_{max}$ among each of the single cells and a minimum state of charge $SOC_{min}$ among the single cells, and n denotes a battery serial number, that is, the state of charge of each of the single cells is recorded as $SOC_1$-$SOC_n$, the ultra capacitor and the battery pack are controlled by the battery management system to charge and discharge.

Further, the battery unit further includes a voltage sensor, a current sensor, an alarm device. The voltage sensor is configured to monitor a voltage of the single cells, the current sensor is configured to monitor a current of the single cells, and the alarm device is configured to send an alarm when the single cells is overcharged or over-discharged.

Further, the battery unit further includes a temperature sensor and a heater. The temperature sensor is configured to monitor a temperature of the single cells. When the average temperature value T is less than the minimum starting temperature $T_{min}$, the single cells is heated by the heater, and the average temperature value T is an average temperature of all the single cells.

Further, the battery management system further includes a control module, a speed sensor, a weight sensor, a laser radar sensor, and a positioning device. The speed sensor is configured to monitor a travelling speed of the monorail hoist locomotive, the weight sensor (14) is configured to monitor a weight borne by the bearing trolley, the laser radar sensor is configured to monitor a road condition ahead of the monorail hoist locomotive and an inclination of a suspension track, the positioning device is configured to monitor a position of the monorail hoist locomotive, data of the speed sensor, the weight sensor, the laser radar sensor and the positioning device are transmitted to the control module, and the control module is configured to analyze the power $P_{req}$ of the monorail hoist locomotive required at a subsequent stage.

Further, the driving unit includes a synchronous reluctance motor, a driving wheel, a hydraulic brake unit and a pressure sensor, the driving wheel is driven by the synchronous reluctance motor, and the pressure sensor is installed on the hydraulic brake unit and configured to monitor the brake pressure of the hydraulic brake unit, and the hydraulic brake unit is configured to clamp the suspension track to implement a braking, data of the pressure sensor are transmitted to the control module, and the synchronous reluctance motor and the hydraulic brake unit are controlled by the control module.

A battery management system for a high-efficiency lithium battery is further provided in the present disclosure. The battery management is applied to the above mentioned monorail hoist locomotive, and the battery management system includes a battery equalization unit, and when an equalization management is performed by the battery equalization unit, the battery management includes following steps.

In S1, whether the battery pack is in a charging state or a discharging state is determined according to a magnitude and a direction of a current of the battery pack, and the minimum state of charge difference $\Delta SOC_{min}$ between the single cells in the battery pack is obtained.

In S2, when the battery pack is in a charging state, a charging equalization is performed on the single cells, specifically, firstly, the state of charge $SOC_n$ of each of the single cells and the maximum state of charge $SOC_{max}$ among the single cells are obtained by the battery equalization unit, when the single cells satisfies $|SOC_n - SOC_{max}| > \Delta SOC_{min}$, that is, one corresponding single cell is required to be charged, then the corresponding single cell required to be charged is charged by the battery equalization unit through the ultra capacitor, and the charging equalization is stopped until the corresponding single cell satisfies $|SOC_n - SOC_{max}| \leq \Delta SOC_{min}$.

When the battery pack is in a discharging state, a discharging equalization is performed on the single cells, specifically, firstly, the state of charge $SOC_n$ of each of the single cells and the minimum state of charge $SOC_{min}$ among the single cells are obtained by the battery equalization unit, when the single cells satisfies $|SOC_n - SOC_{min}| > \Delta SOC_{min}$, that is, one corresponding single cell is required to be discharged, then the corresponding single cell required to be discharged is discharged by the battery equalization unit through the ultra capacitor, and the discharging equalization is stopped until the corresponding single cell satisfies $|SOC_n - SOC_{min}| \leq \Delta SOC_{min}$.

Further, the battery management system further includes a voltage sensor, a current sensor, an alarm device and an overcharge or over-discharge protection unit. When a charging voltage of the single cells is higher than a maximum permissible voltage or a charging current of the single cells is higher than a maximum permissible current, the single cells is controlled by overcharge or over-discharge protection unit to be stopped charging, when a discharging voltage of the single cells is lower than a minimum permissible voltage or a discharging current of the single cells is lower than a minimum permissible current, the single cells are controlled by the overcharge or over-discharge protection unit to be stopped discharging, and when the overcharge or over-discharge protection unit is failed, the alarm device is activated to send an alarm.

Further, the battery management system further includes a temperature sensor, a heater and a thermal management and protection system. Before the monorail hoist locomotive is started, the thermal management and protection system is configured to detect the temperature of the single cells and compare the average temperature value T for the temperature sensor at the single cells with the minimum starting temperature $T_{min}$, when $T \geq T_{min}$, the monorail hoist locomotive is started normally, when $T < T_{min}$, the heater is turned on by the thermal management and protection system to heat the single cells until $T \geq T_{min}$.

When the battery pack is in operating or charging, the average temperature value T for the temperature sensor at the single cells is compared with the maximum permissible temperature $T_{max}$, when $T \geq T_{max}$, a charge-discharge rate is controlled to be reduced, and the temperature of the single cells are continuously detected by the thermal management and protection system until $T < T_{max}$.

Further, the battery management system further includes a control module, a speed sensor, a weight sensor, a laser radar sensor and a positioning device, and transportation modes of the battery management system includes a high-energy-consumption mode and an operation mode.

At a time instant of t=k, a travelling speed $V_k$ of the monorail hoist locomotive at the current time instant is obtained by the speed sensor, when a switch or a bend is detected by the laser radar sensor, or when a preset route node is detected by the positioning device, a travelling speed $V_{k+1}$ at a time instant of t=k+1 is predicted by the laser radar sensor, $V_k$ and the positioning device, and a power $P_{req}$ to be required at a subsequent stage is obtained through the speed sensor, a load weight and an inclination of a track ahead of the monorail hoist locomotive. The operation mode of the monorail hoist locomotive is selected according to $P_{req}$, when $P_{req} > P_0$, the transportation mode is set to the high-energy-consumption mode, and when $0 < P_{req} \leq P_0$, the transportation mode is set to the operation mode, where $P_0$ denotes a preset required power boundary value.

SOC denotes a state of charge, $SOC_L$ denotes an average SOC of the single cells in the battery pack, $SOC_{Lsub}$ denotes a lower limit value for the state of charge $SOC_L$ of the battery pack, $SOC_{Lup}$ denotes an upper limit value for $SOC_L$ of the battery pack, $SOC_{Csub}$ denotes a lower limit value for the state of charge $SOC_C$ of the ultra capacitor, and $SOC_{Cup}$ denotes an upper limit value for $SOC_C$ of the ultra capacitor.

In the high-energy-consumption mode, a power is output by the battery pack and the ultra capacitor jointly, when $SOC_L < SOC_{Lsub}$, the ultra capacitor is taken as an auxiliary power source to output the power, when $SOC_C < SOC_{Csub}$, a power energy of the ultra capacitor is exhausted, and the alarm device is controlled by the control module to send an early warning.

In the operation mode, the battery pack is firstly driven alone, when $SOC_L < SOC_{Lsub}$, the ultra capacitor is taken as the an auxiliary power source to output the power, when $SOC_C < SOC_{Csub}$, the power energy of the ultra capacitor is exhausted, and the alarm device is controlled by the control model to send the early warning.

Further, the driving unit includes a synchronous reluctance motor, a driving wheel, a hydraulic brake unit and a pressure sensor. The battery management system further includes a brake recovery mode, and the brake recovery mode includes a smooth operation condition brake and a complex operation condition brake.

The smooth operation condition brake includes as follows. A brake signal is sent during braking, and the synchronous reluctance motor is controlled to generate a negative torque to implement a braking and an energy recovery.

The complex operation condition brake includes as follows. A road condition ahead of the monorail hoist locomotive is scanned by the laser radar sensor, information of the laser radar sensor is collected and processed by the control module, when an air door, a foreign object or a person are detected ahead of the monorail hoist locomotive, the battery pack and the ultra capacitor are prevented from outputting the power to the synchronous reluctance motor, an estimated brake distance, a recovered potential energy and a kinetic energy are calculated by the control module, according to a current speed of the monorail hoist locomotive, a weight of the monorail hoist locomotive and a slope inclination to calculate a torque to be required for the braking and implement an allocation of a hydraulic and a motor reverse-rotation braking, and specifically, an allocation method is as follows.

The pressure sensor is installed on the hydraulic brake unit, a brake pressure of the hydraulic brake unit is calculated and controlled through a value sensed by the pressure sensor, a negative torque is generated by a remaining brake force through controlling the synchronous reluctance motor to implement the braking and the energy recovery, an energy generated by a reverse rotation of the synchronous reluctance motor is converted into a electrical energy, specifically, firstly, the battery pack is reversely charged, when $SOC_L > SOC_{Lup}$, the charging is stopped to the battery pack, the ultra capacitor is charged by a remaining electrical energy, and when $SOC_C > SOC_{Cup}$, an excess energy is consumed through discharging.

In the present disclosure, a battery management system is designed for the underground monorail hoist locomotive, which implements the equalization management of the lithium battery and the underground safety protection function through dynamically monitoring the operation state and the temperature variation of the battery pack, implements the optimal performance of the monorail hoist locomotive, extends the service life of the battery and improves the transportation efficiency of the underground monorail hoist locomotive through controlling the energy output and the brake energy recovery of the battery pack and the ultra capacitor under different operation modes.

BRIEF DESCRIPTION OF THE DRAWINGS

In order to describe the embodiments of the present disclosure or the technical solutions in the prior art more clearly, the drawings required for use in the embodiments or the descriptions of the prior art will be briefly introduced below. Obviously, the drawings described below are merely some embodiments of the present disclosure, other drawings can be obtained by those of ordinary skilled in the art based on these drawings without paying creative efforts.

DESCRIPTION OF THE EMBODIMENTS

The technical solutions of the embodiments of the present disclosure will be described clearly and completely with reference to the accompanying drawings in the embodiments of the present disclosure. Obviously, the described embodiments are merely one part of the embodiments of the present disclosure, rather than all of the of embodiments. Based on the embodiments of the present disclosure, all other embodiments obtained by those of ordinary skilled in the field without creative efforts are within the protection scope of the present disclosure.

Embodiment 1

Figure 1:
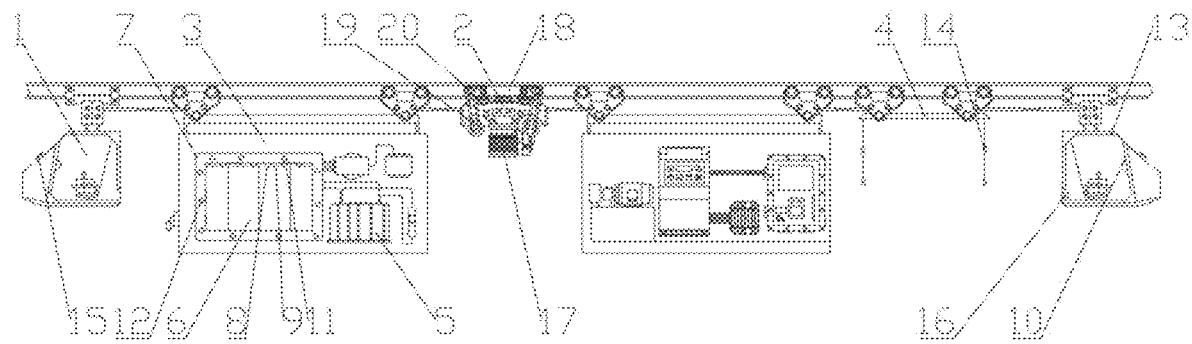
FIG. 1 illustrates a schematic diagram of a high-efficiency lithium battery monorail hoist locomotive in the present disclosure.

As illustrated in FIG. 1, provided is a high-efficiency lithium battery monorail hoist locomotive of this embodiment. The monorail hoist locomotive is moved by utilizing the suspension track, and includes a control cabin 1, a driving unit 2, a battery unit 3 and a bearing trolley 4.

The battery unit 3 includes a battery management system, an ultra capacitor 5 and a battery pack 7 formed by a plurality of single cells 6, preferably the battery pack is a lithium battery pack. The battery management system is configured to obtain the minimum state of charge difference $\Delta SOC_{min}$ between the single cells 6 of the battery pack 7, the state of charge $SOC_n$ of each single cell 6, the maximum state of charge $SOC_{max}$ among the single cells 6 and the minimum state of charge $SOC_{min}$ among the single cells 6, the ultra capacitor 5 and the battery pack 7 are controlled by the battery management system to charge and discharge.

The charging and discharging of the battery pack 7 and the ultra capacitor 5 are managed by the battery management system. During charging and discharging, the ultra capacitor 5 plays a buffering role to reduce the fluctuations of the charging and discharging current and voltage.

The battery unit 3 of this embodiment further includes a voltage sensor 8, a current sensor 9 and an alarm device 10. The voltage sensor 8 and the current sensor 9 are configured to monitor the voltage and current of the single cell 6, and the alarm device 10 is configured to send an alarm when the single cell 6 is overcharged or over-discharged.

The battery unit 3 of this embodiment further includes a temperature sensor 11 and a heater 12. The PTC heater 12 is preferably adopted in this embodiment. The temperature sensor 11 is configured to monitor the temperature of the single cell 6. When the average temperature value T of the single cells 6 is lower than the minimum starting temperature $T_{min}$, the single cell 6 is heated by the heater 12 to prevent the battery temperature from being too low to affect the efficiency.

Preferably, the monorail hoist locomotive further includes a control module, a speed sensor 13, a weight sensor 14, a laser radar sensor 15 and a positioning device 16. The speed sensor 13 is configured to monitor the travelling speed of the monorail hoist locomotive, the weight sensor 14 is configured to monitor the weight borne by the bearing trolley 4, the laser radar sensor 15 is configured to monitor the road conditions ahead of the monorail hoist locomotive and the inclination of the suspension track, and the positioning device 16 is configured to monitor the position of the monorail hoist. The data of the speed sensor 13, the weight sensor 14, the laser radar sensor 15 and the positioning device 16 are transmitted to the control module, and the control module is configured to analyze the power $P_{req}$ of the monorail hoist locomotive required at the subsequent stage Preferably, the driving unit 2 includes a synchronous reluctance motor 17, a driving wheel 18, a hydraulic brake unit 19 and a pressure sensor 20. The driving wheel 18 is driven by the synchronous reluctance motor 17, and the pressure sensor 20 is installed on the hydraulic brake unit 19 to monitor the brake pressure of the hydraulic brake unit 19, and the hydraulic brake unit 19 is configured to clamp the suspension track to implement the braking. The data of the pressure sensor 20 are transmitted to the control module, and the synchronous reluctance motor 17 and the hydraulic brake unit 19 are controlled by the control module. During braking, the braking can be implement by adopting the synchronous reluctance motor 17 or adding the hydraulic brake units 19.

Embodiment 2

Figure 2:
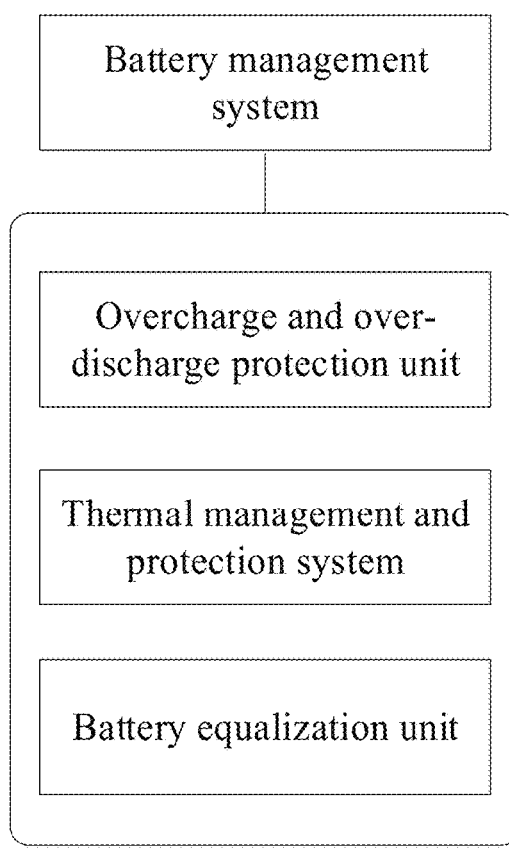
FIG. 2 illustrates a schematic diagram of a battery management system in the present disclosure.

The battery management system of this embodiment is applied to the monorail hoist locomotive in the above embodiment. As illustrated in FIG. 2, the battery management system includes a battery equalization unit, which includes the following steps.

In S1, whether the battery pack 7 is in the charging state or discharging state is determined according to the magnitude and the direction of the current of the battery pack 7, and the minimum state of charge difference $\Delta SOC_{min}$ between the single cells 6 in the battery pack 7 is obtained.

In S2, when the battery pack 7 is in the charging state, a charging equalization is performed on the single cell 6, specifically, firstly, the state of charge $SOC_n$ of each single cell 6 and the maximum state of charge $SOC_{max}$ among the single cells 6 are obtained by the battery equalization unit, when the single cell satisfies $|SOC_n-SOC_{max}|>\Delta SOC_{min}$, that is, the corresponding single cell 6 is required to be charged, then the corresponding single cell 6 required to be charged is charged by the battery equalization unit through the ultra capacitor 5, and the charging equalization is stopped until the corresponding single cell 6 satisfies $|SOC_n-SOC_{max}|\leq\Delta SOC_{min}$.

When the battery pack 7 is in the discharging state, a discharging equalization is performed on the single cells 6, specifically, firstly, the state of charge $SOC_n$ of the each single cell 6 and the minimum state of charge $SOC_{min}$ among the single cells 6 are obtained by the battery equalization unit, when the single cell satisfies $|SOC_n-SOC_{min}|>\Delta SOC_{min}$, that is, the corresponding single cell 6 is required to be discharged, then the corresponding single cell 6 required to be discharged is discharged by the battery equalization unit through the ultra capacitor 5, and the discharging equalization is stopped until the corresponding single cell 6 satisfies $|SOC_n-SOC_{min}|\leq\Delta SOC_{min}$.

Preferably, the battery management system further includes a voltage sensor 8, a current sensor 9, an alarm device 10 and an overcharge or over-discharge protection unit. When the charging voltage of the single cell 6 is higher than the maximum permissible voltage or the charging current of the single cell 6 is higher than the maximum permissible current, the charging to the single cell 6 is controlled to be stopped, when the discharge voltage of the single cell 6 is lower than the minimum permissible voltage or the discharge current of the single cell 6 is lower than the minimum permissible current, the discharging to single cell 6 is controlled to be stopped, and when the overcharge or over-discharge protection unit is failed, the alarm device 10 is activated.

Preferably, the battery management system further includes a temperature sensor 11, a heater 12 and a thermal management and protection system. Before the monorail hoist locomotive is started, the thermal management and protection system is configured to detect the temperature of the single cell 6 and compare the average temperature value T for the temperature sensor 11 at the single cell 6 with the minimum starting temperature $T_{min}$. When $T\geq T_{min}$, the monorail hoist locomotive is started normally, and when $T<T_{min}$, the heater 12 is turned on by the thermal management and protection system to heat the single cell 6 until $T\geq T_{min}$.

When the battery pack 7 is in operating or charging, the average temperature value T of the temperature sensor 11 at the single cell 6 is compared with the maximum permissible temperature $T_{max}$, when $T\geq T_{max}$, the charge-discharge rate is controlled to be reduced, and the temperature of the single cell 6 is continuously detected by the thermal management and protection system until $T<T_{max}$.

Figure 3:
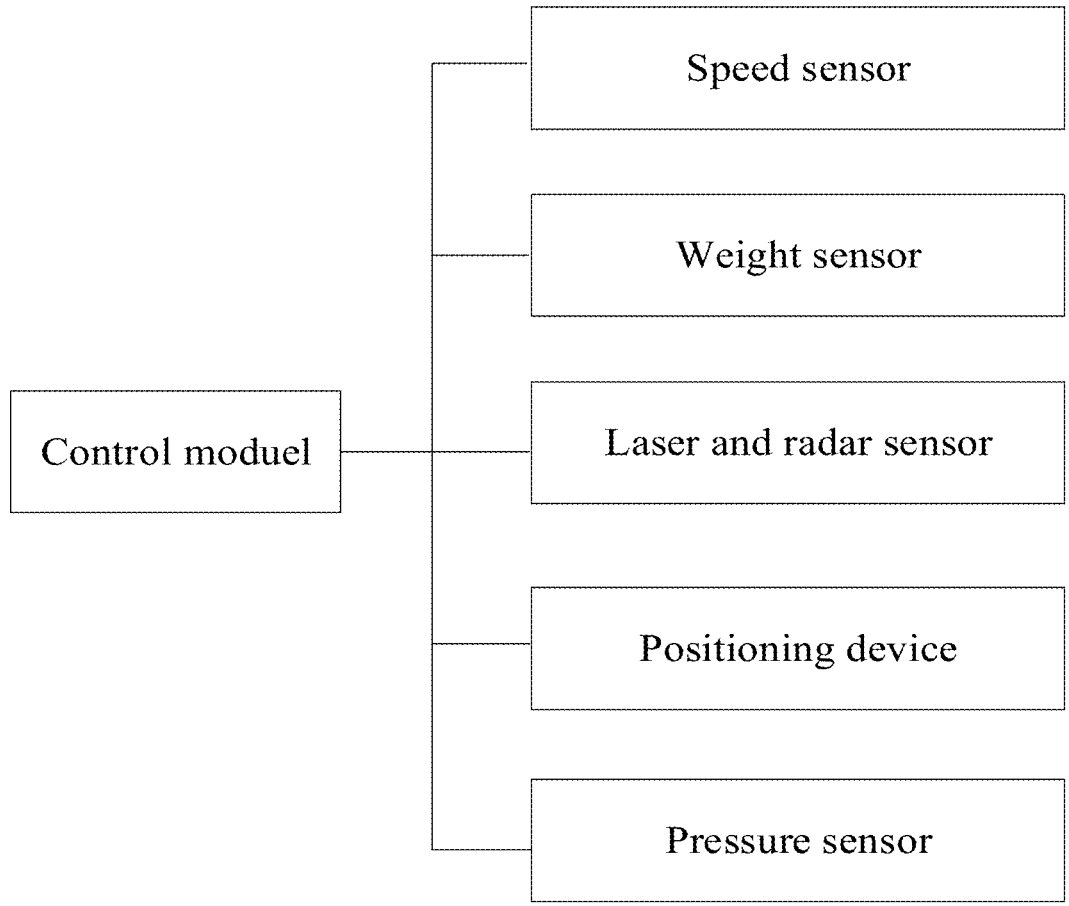
FIG. 3 illustrates a schematic diagram of a control module in the present disclosure.

Preferably, with reference to FIG. 3, the monorail hoist locomotive includes a control module, a speed sensor 13, a weight sensor 14, a laser radar sensor 15 and a positioning device 16. When the monorail hoist locomotive is in a heavy load condition and travelling on an upslope track, the power to be required is relative large, and a high-energy consumption mode is selected, and when the monorail hoist locomotive is in an no-load condition or travelling on a horizontal track, or the power to be required is common, and an operation mode is selected, which includes as follows.

At a time instant of t=k, a travelling speed $V_k$ at the current instant of the monorail hoist locomotive is obtained through the speed sensor 13. When a switch or a bend is detected by the laser radar sensor 15, or when a preset route node is detected by the positioning device 16, a travelling speed $V_{k+1}$ at a time instant of t=k+1 is predicted by the laser radar sensor 15, $V_k$ and the positioning device 16, and the power $P_{req}$ to be required at the subsequent stage is obtained through the speed sensor 13, the load weight and inclination of the track ahead of the monorail hoist locomotive. The operation mode of the monorail hoist locomotive is selected according to $P_{req}$, and the required power boundary value is set to $P_0$. When $P_{req}>P_0$, the transportation mode is set to the high-energy-consumption mode, when $0<P_{req}\leq P_0$, the transportation mode is set to the operation mode. The time instant k is an arbitrary time instant when the monorail hoist locomotive is travelling, and the time instant k+1 is a time instant of one measurement unit after the time instant k, and the specific measurement unit can be selected according to actual requirements.

SOC denotes the state of charge, $SOC_L$ denotes the average SOC of the single cells 6 in the battery pack 7, $SOC_{Lsub}$ denotes the lower limit value for the state of charge $SOC_L$ of the battery pack 7, $SOC_{Lup}$ denotes the upper limit value for $SOC_L$ of the battery pack 7, $SOC_{Csub}$ denotes the lower limit value for the state of charge $SOC_C$ of the ultra capacitor 5, and $SOC_{Cup}$ denotes the upper limit value for $SOC_C$ of the ultra capacitor 5.

Figure 4:
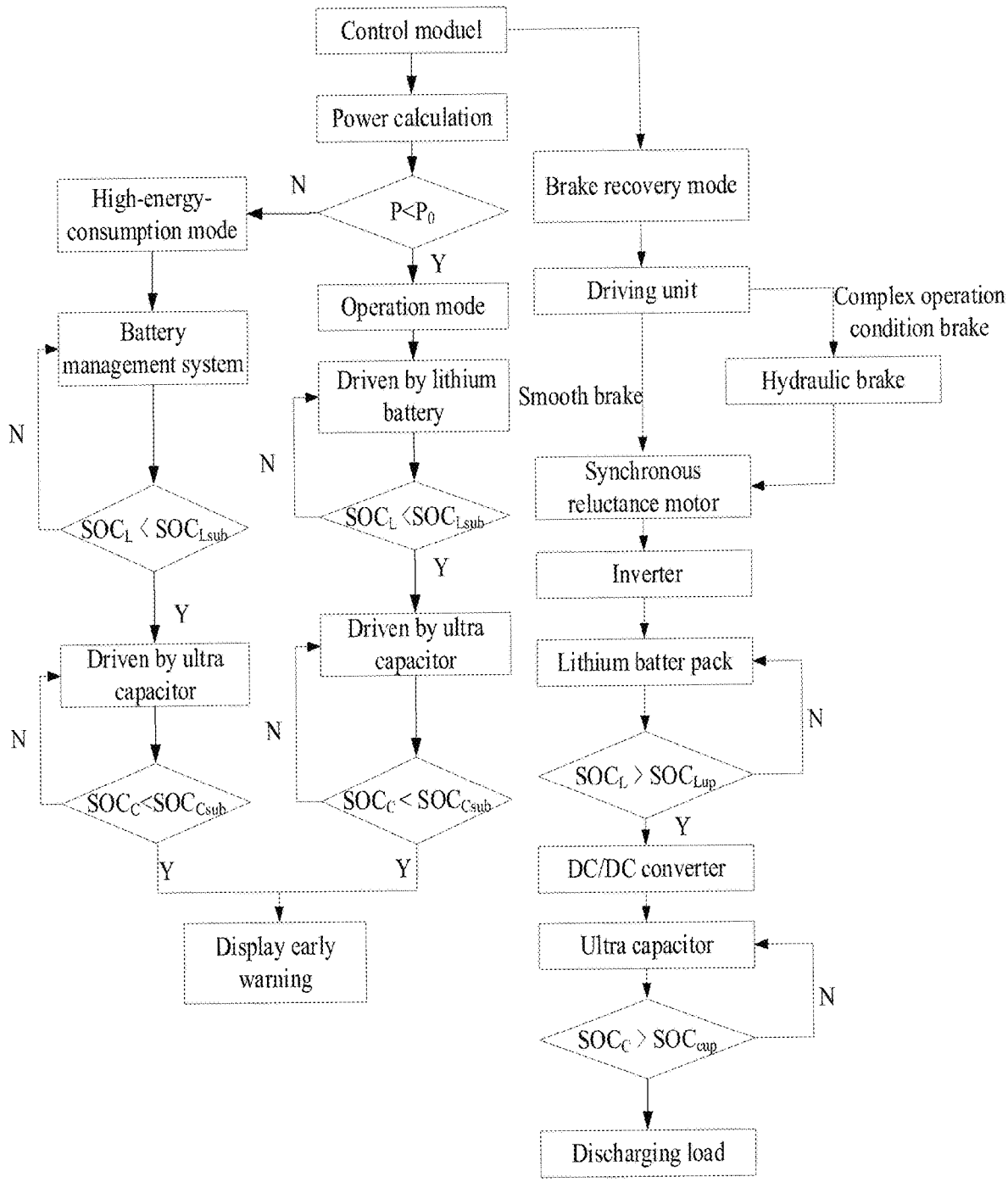
FIG. 4 illustrates a flow diagram of the driving and braking in the present disclosure.

With reference to FIG. 4, in the high-energy-consumption mode, the power is output by the battery pack 7 and the ultra capacitor 5 jointly, when $SOC_L<SOC_{Lsub}$, the ultra capacitor 5 is taken as an auxiliary power source to output the power. when $SOC_C<SOC_{Csub}$, the power energy of the ultra capacitor 5 is exhausted, and the alarm device 10 is controlled by the control module to send an early warning. Certainly, the high temperature protection of the single cell 6 is not be considered in the high-energy-consumption mode.

In the operation mode, the battery pack 7 is firstly driven alone, when $SOC_L<SOC_{Lsub}$, the ultra capacitor 5 is taken as an auxiliary power source to output the power, when $SOC_C<SOC_{Csub}$, the power energy of the ultra capacitor 5 is exhausted, and the alarm device 10 is controlled by the control model to send an early warning.

Preferably, the driving unit 2 includes a synchronous reluctance motor 17, a driving wheel 18, a hydraulic brake unit 19 and a pressure sensor 20. The battery management system further includes a brake recovery mode set for the monorail hoist locomotive, and the brake recovery mode includes a smooth operation condition brake and a complex operation condition brake.

The smooth operation condition brake is that when the monorail hoist locomotive is travelling smoothly on the horizontal track, the deceleration can be performed on the monorail hoist locomotive, a braking signal is sent during braking, and the synchronous reluctance motor 17 is controlled by the monorail hoist locomotive to generate a negative torque to implement the braking and the energy recovery.

The complex operation condition brake are that when the monorail hoist locomotive is travelling on the conditions such as downslope, bend, or emergency brake, the road condition ahead of the monorail hoist locomotive is scanned by the laser radar sensor 15, and the information of the laser radar sensor 15 is collected and processed by the control module, when an air door, a foreign object or a person are detected ahead of the monorail hoist locomotive, the battery pack 7 and the ultra capacitor 5 are prevented from outputting to the synchronous reluctance motor 17, the estimated brake distance as well as the recovered potential energy and kinetic energy are calculated by the control module according to the current speed of the monorail hoist locomotive, the weight of the monorail hoist locomotive and the slope inclination to calculate the torque to be required for the braking and implement the allocation of the hydraulic and the motor reverse-rotation brake, and specifically, the allocation method is as follows.

The pressure sensor 20 is installed on the hydraulic brake unit 19, and the brake pressure of the hydraulic brake unit 19 is controlled and calculated by the control unit through the value sensed by the pressure sensor 20. The negative torque is generated by the remaining brake force through controlling the synchronous reluctance motor 17 to implement the braking and the energy recovery, in such a way, the friction and the abrasion on the brake shoe on the hydraulic brake unit 19 is relative low, and the excess kinetic energy or potential energy can be effectively recovered during downslope braking.

The energy generated by the reverse rotation of the synchronous reluctance motor 17 is converted into the electrical energy, specifically, firstly, the battery pack 7 is reversely charged via an inverter. When $SOC_L > SOC_{Lup}$, the charging to the battery pack 7 is stopped, and the remaining electrical energy is charged to the ultra capacitor 5 via the DC/DC converter, and when $SOC_C > SOC_{Cup}$, the excess energy is consumed by the discharging load.

After the battery management system determines that the operation mode is a high-energy-consumption mode, the power output of the battery pack 7 and the ultra capacitor 5 are reallocated, so that the travelling speed of the locomotive is controlled and the instantaneous large fluctuations in the power of the battery pack 7 is avoided. The power output of the composite power supply is allocated by utilizing the fuzzy control based on the fruit fly optimization.

Obviously, those skilled in the art can make various changes and modifications to the present disclosure without departing from the spirit and scope of the present disclosure. Thus, if these modifications and variations of the present disclosure fall within the scope of the claims of the present disclosure and their equivalents, the present disclosure is also intended to include these modifications and variations.

What is claimed is:

1. A battery management system for a high-efficiency lithium battery monorail hoist locomotive, applied to the high-efficiency lithium battery monorail hoist locomotive, comprising: a driving unit, a battery unit and a bearing trolley, wherein the bearing trolley is configured to bear cargoes, the battery unit is configured to output a power to the driving unit, the driving unit is configured to drive the monorail hoist locomotive to move, the battery unit comprises a battery management system, an ultra capacitor and a battery pack formed by a plurality of single cells, the battery management system is configured to obtain a minimum state of charge difference $\Delta SOC_{min}$ between the single cells in the battery pack, a state of charge $SOC_n$ of each of the single cells, a maximum state of charge $SOC_{max}$ among the single cells and a minimum state of charge $SOC_{min}$ among the single cells, the ultra capacitor and the battery pack are controlled by the battery management system to charge and discharge, n denotes a battery serial number, wherein the battery management system comprises a battery equalization unit, and when an equalization management is performed by the battery equalization unit, the battery management comprises following steps:

S1, determining, according to a magnitude and a direction of a current of the battery pack, whether the battery pack is in a charging state or a discharging state; and obtaining the minimum state of charge difference $\Delta SOC_{min}$ of the single cells in the battery pack; and S2, performing, when the battery pack is in the charging state, a charging equalization on the single cells, firstly, obtaining, by the battery equalization unit, the state of charge $SOC_n$ of the each of the single cells and the maximum state of charge $SOC_{max}$ among the single cells; charging, when the single cells satisfy $|SOC_n - SOC_{max}| > \Delta SOC_{min}$, that is, a corresponding single cell is required to be charged, the corresponding single cell required to be charged by the battery equalization unit through the ultra capacitor; and stopping, until the corresponding single cell required to be charged satisfies $|SOC_n - SOC_{max}| \leq \Delta SOC_{min}$, the charging equalization; and performing, when the battery pack is in the discharging state, a discharging equalization on the single cells, firstly, obtaining, by the battery equalization unit, the state of charge $SOC_n$ of the each of the single cells and the minimum state of charge $SOC_{min}$ among the single cells; discharging, when the single cells satisfy $|SOC_n - SOC_{min}| > \Delta SOC_{min}$, that is, a corresponding single cell is required to be discharged, the corresponding single cell required to be discharged by the battery equalization unit through the ultra capacitor; and stopping, until the corresponding single cell required to be discharged satisfies $|SOC_n - SOC_{min}| \leq \Delta SOC_{min}$, the discharging equalization.

2. The battery management system for the high-efficiency lithium battery monorail hoist locomotive according to claim 1, wherein the battery management system further comprises a voltage sensor, a current sensor, an alarm device and an overcharge or over-discharge protection unit; when a charging voltage of the single cells is higher than a maximum permissible voltage or a charging current of the single cells is higher than a maximum permissible current, the single cells are controlled by the overcharge or over-discharge protection unit to be stopped charging, when a discharge voltage of the single cells is lower than a minimum permissible voltage or a discharge current of the single cells is lower than a minimum permissible current, the single cells are controlled by the overcharge or over-discharge protection unit to be stopped discharging, when the overcharge or over-discharge protection unit is failed, the alarm device is activated to send an alarm.

3. The battery management system for the high-efficiency lithium battery monorail hoist locomotive according to claim 1, wherein the battery management system further comprises a temperature sensor, a heater and a thermal management and protection system, before the monorail hoist locomotive is started, the thermal management and protection system is configured to detect a temperature of the single cells, and compare an average temperature value T for the temperature sensor at the single cells with a minimum starting temperature $T_{min}$, when $T \geq T_{min}$, the monorail hoist locomotive is started normally, and when $T < T_{min}$, the heater is turned on by the thermal management and protection system to heat the single cells until $T \geq T_{min}$; and when the battery pack is operating or charging, the average temperature value T for the temperature sensor at the single cells is compared with a maximum permissible temperature $T_{max}$, when $T \geq T_{max}$, a charge-discharge rate is controlled to be reduced, and the temperature of the single cells is continuously detected by the thermal management and protection system, until $T < T_{max}$.

4. The battery management system for the high-efficiency lithium battery monorail hoist locomotive according to claim 1, further comprising a control module, a speed sensor, a weight sensor, a laser radar sensor and a positioning device, and transportation modes of the battery management system comprises a high-energy-consumption mode and an operation mode, at a time instant of t=k, a travelling speed $V_k$ of the monorail hoist locomotive at a current time instant is obtained by the speed sensor, when a switch or a bend is detected by the laser radar sensor, or when a preset route node is detected by the positioning device, a travelling speed $V_{k+1}$ at a time instant of t=k+1 is predicted by the laser radar sensor, $V_k$ and the positioning device, and a power $P_{req}$ required at a subsequent stage is obtained through the speed sensor, a load weight and an inclination of a track ahead of the monorail hoist locomotive, the operation mode of the monorail hoist locomotive is selected according to $P_{req}$, when $P_{req} > P_0$, the transportation mode is set to the high-energy-consumption mode, and when $0 < P_{req} \leq P_0$, the transportation mode is set to the operation mode, where $P_0$ denotes a preset required power boundary value;

SOC denotes a state of charge, $SOC_L$ denotes an average SOC of the single cells in the battery pack, $SOC_{Lsub}$ denotes a lower limit value for the state of charge $SOC_L$ of the battery pack, $SOC_{Lup}$ denotes an upper limit value for $SOC_L$ of the battery pack, $SOC_{Csub}$ denotes a lower limit value for the state of charge $SOC_C$ of the ultra capacitor, and $SOC_{Cup}$ denotes an upper limit value for $SOC_C$ of the ultra capacitor;

in the high-energy-consumption mode, a power is output by the battery pack and the ultra capacitor jointly, when $SOC_L < SOC_{Lsub}$, the ultra capacitor is taken as an auxiliary power source to output the power, when $SOC_C < SOC_{Csub}$, a power energy of the ultra capacitor is exhausted, and the alarm device is controlled by the control module to send an early warning; and in the operation mode, the battery pack is firstly driven alone, when $SOC_L < SOC_{Lsub}$, the ultra capacitor is taken as the auxiliary power source to output the power, when $SOC_C < SOC_{Csub}$, the power energy of the ultra capacitor is exhausted, and the alarm device is controlled by the control model to send the early warning.

5. The battery management system for the high-efficiency lithium battery monorail hoist locomotive according to claim 4, wherein the driving unit comprises a synchronous reluctance motor, a driving wheel, a hydraulic brake unit and a pressure sensor, the battery management system further comprises a brake recovery mode, and the brake recovery mode comprises a smooth operation condition brake and a complex operation condition brake, the smooth operation condition brake comprises sending a brake signal during braking; and controlling the synchronous reluctance motor to generate a negative torque to implement a braking and an energy recovery;

the complex operation condition brake comprises scanning, by the laser radar sensor, a road condition ahead of the monorail hoist locomotive; collecting and processing, by the control module, information of the laser radar sensor; preventing, when an air door, a foreign object or a person are detected ahead of the monorail hoist locomotive, the battery pack and the ultra capacitor from outputting power to the synchronous reluctance motor; and calculating, by the control module, an estimated brake distance as well as a recovered potential energy and a kinetic energy, according to a current speed of the monorail hoist locomotive, a weight of the monorail hoist locomotive and a slope inclination to calculate a torque to be required for the braking and implement an allocation of a hydraulic and a motor reverse-rotation braking, and an allocation method comprises:

calculating and controlling, through a value sensed by the pressure sensor, a brake pressure of the hydraulic brake unit, generating, by a remaining brake force, a negative torque through controlling the synchronous reluctance motor to implement the braking and the energy recovery, converting an energy generated by a reverse rotation of the synchronous reluctance motor into an electrical energy, firstly, reversely-charging to battery pack, stopping, when $SOC_L > SOC_{Lup}$, charging to the battery pack; charging, by a remaining electrical energy, to the ultra capacitor; and consuming, when $SOC_C > SOC_{Cup}$, an excess energy through discharging, wherein the pressure sensor is installed on the hydraulic brake unit.

6. The battery management system for the high-efficiency lithium battery monorail hoist locomotive according to claim 1, wherein the battery unit further comprises a voltage sensor, a current sensor and an alarm device, the voltage sensor is configured to monitor a voltage of the single cells, the current sensor is configured to monitor a current of the single cells, and the alarm device is configured to send an alarm when the single cells are overcharged or over-discharged.

7. The battery management system for the high-efficiency lithium battery monorail hoist locomotive according to claim 1, wherein the battery unit further comprises a temperature sensor and a heater, the temperature sensor is configured to monitor a temperature of the single cells, when the average temperature value T is less than a minimum starting temperature $T_{min}$, the single cells are heated by the heater, wherein the average temperature value T is an average temperature of all the single cells.

8. The battery management system for the high-efficiency lithium battery monorail hoist locomotive according to claim 1, further comprising a control module, a speed sensor, a weight sensor, a laser radar sensor and a positioning device, the speed sensor is configured to monitor a travelling speed of the monorail hoist locomotive, the weight sensor is configured to monitor a weight borne by the bearing trolley, the laser radar sensor is configured to monitor a road condition ahead of the monorail hoist locomotive and an inclination of a suspension track, the positioning device is configured to monitor a position of the monorail hoist locomotive, data of the speed sensor, the weight sensor, the laser radar sensor and the positioning device is transmitted to the control module, and the control module is configured to analyze a power $P_{req}$ required for the monorail hoist locomotive at a subsequent stage.

9. The battery management system for the high-efficiency lithium battery monorail hoist locomotive according to claim 8, wherein the driving unit comprises a synchronous reluctance motor, a driving wheel, a hydraulic brake unit and a pressure sensor, the driving wheel is driven by the synchronous reluctance motor, and the pressure sensor is installed on the hydraulic brake unit and configured to monitor a brake pressure of the hydraulic brake unit, and the hydraulic brake unit is configured to clamp a suspension track to implement a braking, data of the pressure sensor is transmitted to the control module, and the synchronous reluctance motor and the hydraulic brake unit are controlled by the control module.

* * * * *